(12) United States Patent
Webb et al.

(10) Patent No.: US 7,213,749 B2
(45) Date of Patent: May 8, 2007

(54) INTERACTIVE MULTIMEDIA SMART AFFINITY CARD

(75) Inventors: Richard S. Webb, Newport Beach, CA (US); Randall P. Bertuccelli, Walnut Creek, CA (US)

(73) Assignee: R&R Card Systems, Inc., Walnut Creek, CA (US)

( * ) Notice: Subject to any disclaimer, the term of this patent is extended or adjusted under 35 U.S.C. 154(b) by 0 days.

(21) Appl. No.: 11/060,210

(22) Filed: Feb. 16, 2005

(65) Prior Publication Data
US 2005/0194450 A1    Sep. 8, 2005

Related U.S. Application Data

(60) Provisional application No. 60/545,418, filed on Feb. 17, 2004.

(51) Int. Cl.
*G11B 7/0033*  (2006.01)
*G11B 7/24*    (2006.01)
*G11B 23/03*   (2006.01)
*G06K 5/00*    (2006.01)
*B65D 85/30*   (2006.01)
*B65D 85/57*   (2006.01)

(52) U.S. Cl. .................. 235/380; 235/493; 206/308.1; 720/719; 720/745

(58) Field of Classification Search ............... 235/380, 235/493; 902/26, 27; 206/308.1; 720/719, 720/745
See application file for complete search history.

(56) References Cited

U.S. PATENT DOCUMENTS

| | | | | |
|---|---|---|---|---|
| 4,390,978 A | * | 6/1983 | Pollack | 369/220 |
| 4,428,483 A | * | 1/1984 | Narita et al. | 206/459.1 |
| 4,463,849 A | * | 8/1984 | Prusak et al. | 206/307 |
| 4,773,058 A | * | 9/1988 | Petruchik et al. | 720/642 |
| 4,868,373 A | * | 9/1989 | Opheij et al. | 235/380 |
| 5,377,825 A | * | 1/1995 | Sykes et al. | 206/232 |
| 5,548,571 A | * | 8/1996 | Mistretta | 720/645 |
| 5,844,757 A |   | 12/1998 | Rose | |
| 5,944,180 A | * | 8/1999 | Koh et al. | 206/308.1 |
| 6,016,298 A | * | 1/2000 | Fischer | 720/745 |
| 6,040,773 A | * | 3/2000 | Vega et al. | 340/572.1 |
| 6,122,145 A | * | 9/2000 | Hoyle | 360/133 |
| 6,181,664 B1 | * | 1/2001 | Kano et al. | 720/645 |

(Continued)

FOREIGN PATENT DOCUMENTS

JP    08282765 A   * 10/1996

(Continued)

OTHER PUBLICATIONS

Upgrading and Repairing PCs Eigth Edition == Ch 17—CD-ROM Drives☐☐http://lib.daemon.am/Books/Upgrading_PC/ch17/ch17.htm.*

(Continued)

*Primary Examiner*—Daniel Walsh
(74) *Attorney, Agent, or Firm*—Townsend and Townsend and Crew LLP; Gerald T. Gray

(57) ABSTRACT

A multimedia card, including, a multimedia portion, a multimedia card holder portion, and a multimedia cover portion, and wherein the multimedia cover portion and the multimedia card holder portion releasably cover the multimedia card portion in between the multimedia cover portion and the multimedia card holder portion.

14 Claims, 9 Drawing Sheets

U.S. PATENT DOCUMENTS

| | | | |
|---|---|---|---|
| 6,243,356 B1 * | 6/2001 | Rubino, III | 720/734 |
| 6,283,282 B1 * | 9/2001 | Wong et al. | 206/308.1 |
| 6,304,544 B1 * | 10/2001 | Pierson et al. | 369/273 |
| 6,307,830 B1 * | 10/2001 | Shultz | 369/281 |
| 6,349,822 B1 * | 2/2002 | Greene | 206/308.1 |
| 6,418,113 B1 * | 7/2002 | Ikebe et al. | 720/738 |
| 6,443,299 B2 * | 9/2002 | Kuremoto et al. | 206/308.1 |
| 6,450,332 B1 * | 9/2002 | Courchesne | 206/308.1 |
| 6,510,124 B1 | 1/2003 | Wood | |
| 6,542,444 B1 * | 4/2003 | Rutsche | 369/14 |
| 6,547,068 B2 * | 4/2003 | Chu | 206/310 |
| 6,597,653 B1 * | 7/2003 | Burnett | 369/273 |
| 6,616,052 B2 * | 9/2003 | Tseng et al. | 235/487 |
| 6,698,586 B2 * | 3/2004 | Sankey et al. | 206/308.1 |
| 6,749,114 B2 * | 6/2004 | Madani | 235/380 |
| 6,762,988 B2 | 7/2004 | Wood | |
| 6,782,548 B2 * | 8/2004 | Takizawa et al. | 720/719 |
| 6,789,261 B2 * | 9/2004 | Oishi | 720/719 |
| 6,814,286 B2 * | 11/2004 | Cheung | 235/440 |
| 6,874,158 B2 * | 3/2005 | Chan et al. | 720/720 |
| 7,055,687 B2 * | 6/2006 | Bruet-Ferreol | 206/308.1 |
| 7,117,512 B1 * | 10/2006 | Cahill | 720/745 |
| 2002/0006103 A1 * | 1/2002 | Duroj | 369/273 |
| 2002/0027090 A1 | 3/2002 | Sankey et al. | |
| 2002/0027837 A1 * | 3/2002 | Weber | 369/14 |
| 2002/0038769 A1 * | 4/2002 | Hegarty et al. | 206/308.1 |
| 2002/0056654 A1 * | 5/2002 | Carman et al. | 206/308.1 |
| 2002/0085375 A1 * | 7/2002 | Wang et al. | 362/154 |
| 2002/0154597 A1 * | 10/2002 | Chan et al. | 369/289 |
| 2003/0024995 A1 * | 2/2003 | Conner et al. | 235/492 |
| 2003/0136846 A1 * | 7/2003 | Higgins et al. | 235/487 |
| 2003/0139163 A1 * | 7/2003 | Noda et al. | 455/269 |
| 2003/0155425 A1 * | 8/2003 | Lynch | 235/492 |
| 2003/0173409 A1 * | 9/2003 | Vogt et al. | 235/492 |
| 2003/0205491 A1 * | 11/2003 | Huang | 206/310 |
| 2004/0026274 A1 * | 2/2004 | Bruet-Ferreol | 206/308.1 |
| 2004/0055910 A1 * | 3/2004 | Boorman | 206/308.1 |
| 2004/0056102 A1 * | 3/2004 | Cheung | 235/486 |
| 2004/0074790 A1 * | 4/2004 | Kuremoto et al. | 206/308.1 |
| 2004/0173480 A1 * | 9/2004 | Reinecke et al. | 206/308.1 |
| 2004/0188530 A1 * | 9/2004 | Cook et al. | 235/486 |
| 2004/0242270 A1 * | 12/2004 | Bhatt et al. | 455/558 |
| 2004/0252601 A1 * | 12/2004 | Nagatomo et al. | 369/47.17 |
| 2005/0061889 A1 * | 3/2005 | McGee et al. | 235/487 |
| 2005/0066626 A1 * | 3/2005 | Hutcheon | 53/445 |
| 2005/0155879 A1 * | 7/2005 | Hoogland | 206/308.1 |
| 2005/0193407 A1 * | 9/2005 | Lessard | 720/728 |
| 2005/0194450 A1 * | 9/2005 | Webb et al. | 235/487 |
| 2005/0224378 A1 * | 10/2005 | Hoogland | 206/308.1 |
| 2006/0021884 A1 * | 2/2006 | Castritis | 206/308.1 |
| 2006/0048167 A1 * | 3/2006 | Volk et al. | 720/600 |
| 2006/0067183 A1 * | 3/2006 | Hattori et al. | 369/47.1 |
| 2006/0124749 A1 * | 6/2006 | Osborn et al. | 235/486 |
| 2006/0171074 A1 * | 8/2006 | Wagner et al. | 360/133 |
| 2006/0171290 A1 * | 8/2006 | Shinotsuka et al. | 369/275.1 |
| 2006/0179449 A1 * | 8/2006 | Kurita et al. | 720/738 |
| 2006/0181806 A1 * | 8/2006 | Fahimi et al. | 360/131 |
| 2006/0182009 A1 * | 8/2006 | Horie | 369/275.1 |
| 2006/0198281 A1 * | 9/2006 | Corley et al. | 369/273 |

FOREIGN PATENT DOCUMENTS

| WO | WO2003065375 | * | 8/2006 |
| WO | WO2002097819 | * | 12/2006 |

OTHER PUBLICATIONS

Optical Disc Packaging—Wikipedia http://en.wikipedia.org/wiki/Cd_case.*

* cited by examiner

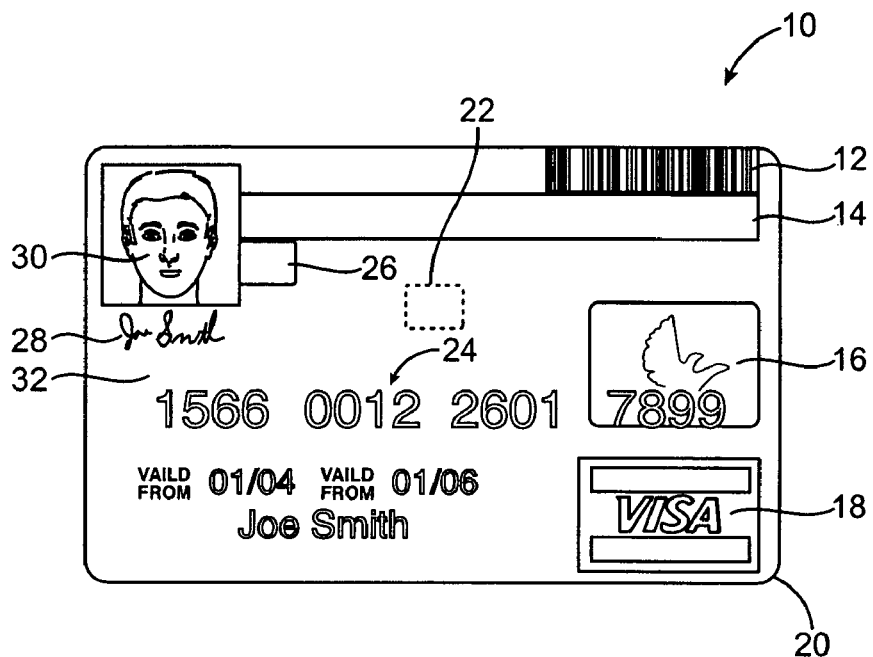
FIG. 1
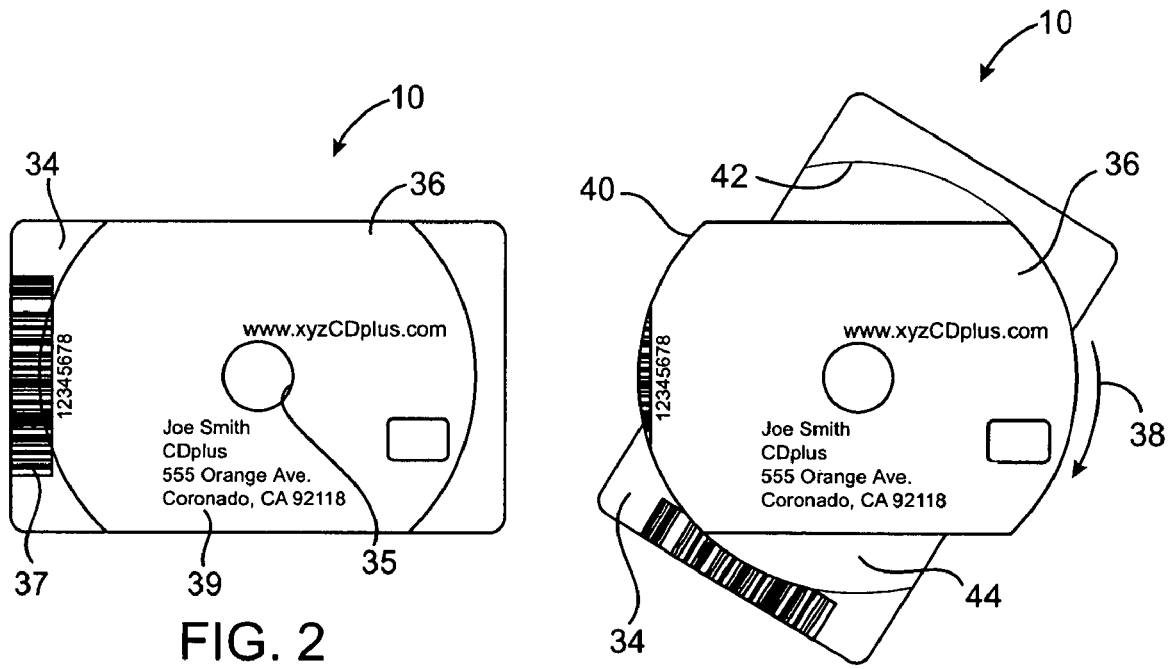
FIG. 2
FIG. 3

INTERACTIVE MULTIMEDIA SMART AFFINITY CARD

CROSS-REFERENCES TO RELATED APPLICATIONS

This application claims the benefit of U.S. Provisional Application No. 60/545,418, filed Feb. 17, 2004, entitled "INTERACTIVE MULTIMEDIA SMART CARD", hereby incorporated herein by reference in its entirety.

FIELD OF DISCLOSURE

Disclosed is an interactive multimedia smart card, and more particularly, an interactive multimedia smart card that stores digital information utilizing compact disks (CD) or digital video disks (DVD), including affinity card, smart card, debit card, and credit card capabilities.

BACKGROUND OF THE DISCLOSURE

Many attempts have been made to combine the benefits of storing digital media through CD or DVD technology with a banking or affinity card. Nevertheless, digital media, such as CDs or DVDs are required to have a thickness that is standard in the computer industry to allow the digital information to be read from the digital media. For example, a typical CD is approximately 1.2 mm in thickness.

In contrast, a typical credit card is approximately 0.033 inches (about 30 mil) in thickness, and this is the standard thickness for credit cards since it is desirable for credit cards to have a standard thickness that may be inserted into a credit card reader for reading information or data that is stored on a magnetic strip. Therefore, to date, it has been a challenge to provide a banking card that may be inserted into the corresponding machines for the reading of information from the bank card in a CD or DVD reader.

BRIEF SUMMARY OF THE DISCLOSURE

Disclosed is an interactive multimedia smart card, otherwise known herein as a multipurpose card, wherein the multimedia card portion incorporates digital media, such as a CD or DVD disk. The card also includes a banking card portion, which may include a smart chip, a magnetic strip, or affinity, credit, or debit card capabilities, wherein the card is utilized in a wallet-sized platform. The multimedia card portion and the banking card portion both include means for connecting to each other so that the card portions create a stacked relationship relative to each other. The top layer, or the banking card portion, consists of an otherwise traditional looking embossed plastic affinity, credit, debit, or smart card. And the bottom layer, or the multimedia card portion consists of a credit card shaped digital media, such as a CD or DVD disk. The CD or DVD disk may be in the format that is read only or it may include a read/write format. The multimedia card portion and the banking card portion are joined together by locking means, which allows for separation and reconnection by moving the card portions in opposite directions. For example, the card portions may be twisted apart relative to each other. When separated, the banking card portion may be used in existing terminal card readers, including those terminal card readers that read information through a smart chip, or a swipe of a bank card, or terminal card readers that utilize motorized card reading mechanisms. The multimedia card portion may be utilized in most existing CD and/or DVD read or write mechanism, such as those utilized in computers or in home theater systems.

A multimedia card, including, a multimedia card portion, a multimedia card holder portion, and a multimedia cover portion, wherein the multimedia cover portion optionally includes a magnetic stripe containing magnetic information, and wherein the multimedia cover portion and the multimedia card holder portion releasably cover the multimedia card portion in between the multimedia cover portion and the multimedia card holder portion.

BRIEF DESCRIPTION OF THE DRAWINGS

FIG. 1 is a top plan view of an interactive multimedia smart affinity card according to a first embodiment of the present disclosure;

FIG. 2 is a rear plan view of the interactive multimedia smart affinity card according to the first embodiment;

FIG. 3 illustrates a rear plan view of the card according to the first embodiment, wherein the multimedia portion of the card is shown rotated in relation to a banking portion of the card;

DETAILED DESCRIPTION OF THE INVENTION

Figure 4:
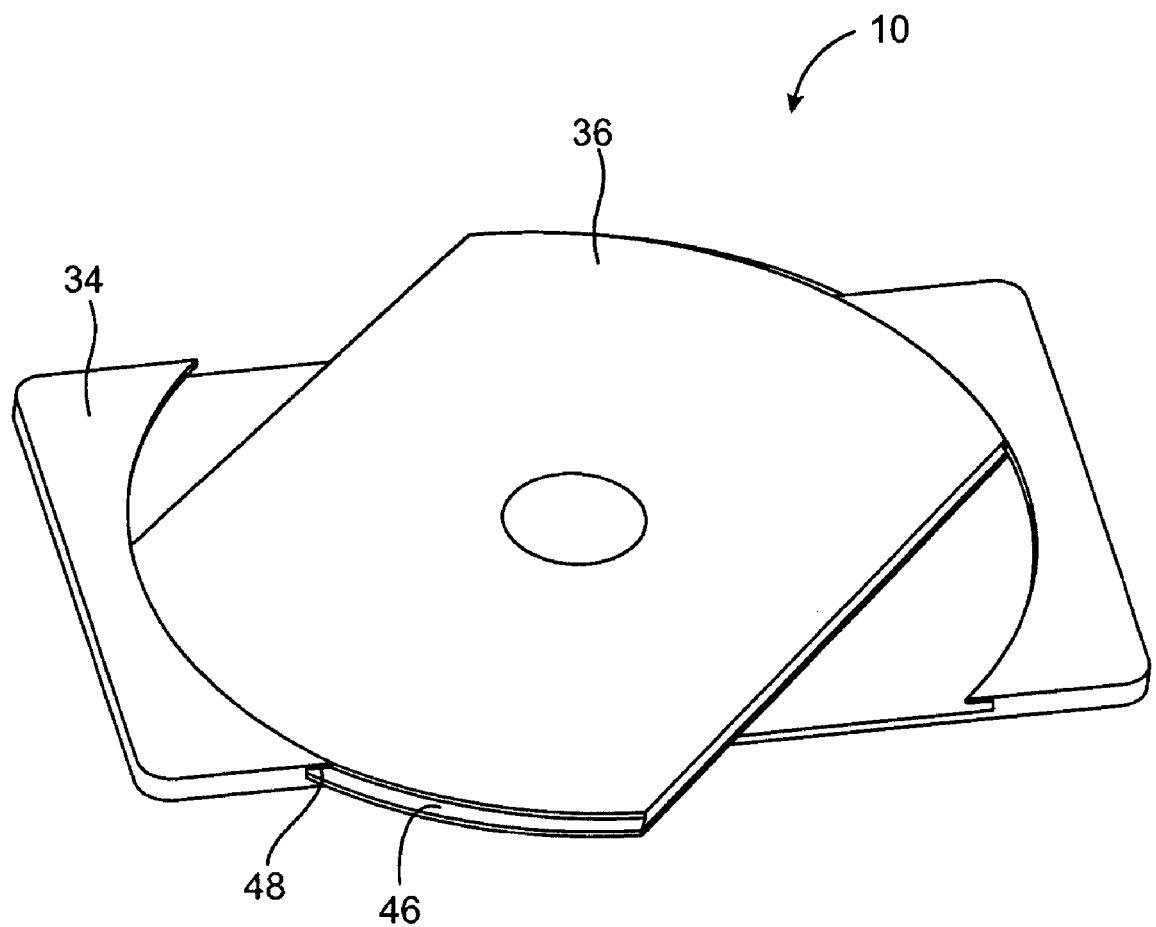
FIG. 4 is a rear perspective view of the card, similar to the view shown in FIG. 3, illustrating the first embodiment.

Disclosed herein is an interactive multimedia smart card incorporating a multimedia card portion that is releasably connected to a banking card portion, and the card portions are in a layered or stacked configuration. As shown in FIGS.

1 through 4, in a first embodiment, the multipurpose card can include a bank card portion 32 and a multimedia card portion 36. As shown in FIG. 1, the bank card portion may be an affinity card, a credit card, a debit card, and may include other technologies that are being incorporated into banking cards, as will be further described below. An affinity card may be offered by two organizations; one is a card issuer and the other is a professional association, special interest group or other non-bank company that offer the affinity card. Usually, use of the card entitles holders to special discounts or deals from the non-financial group. For example, in the embodiment shown in FIG. 1, the bank card portion 32 includes a bar code 12 so that the bank card portion may be scanned and provide additional information to a merchant or affiliate. The bank card portion also may include a magnetic strip or magnetic data 14 that is adhered to the bank card portion so that the bank card portion may be swiped or utilized in motorized card reader mechanisms. For safety purposes, the bank card portion may further include a hologram 16 and even an identification photo 30 of the bank card holder. The bank card portion may further include a logo 18 identifying the issuer of the bank card, or an affiliate associated with the issuer of the bank card. The bank card portion and the multimedia portion combine to make the multipurpose card 10, which may be in a wallet size card platform for easy carrying by the card holder and allows for convenient storage and distribution by an affiliate or the issuer.

The bank card portion may include a non-contact chip 22. Contactless smart cards, sometimes known as RFID cards, are passed near an antenna (Reader) without any physical connectivity, to carry out a transaction. They look just like plastic credit cards, except that they have an electronic microchip and an antenna embedded inside. The CLSC components allow the card to communicate with an antenna/coupler unit without any physical contact. Contactless cards are self-powering, i.e., they use the energy of the radio waves emanating from the readers. Contact smart cards must be inserted physically into a smart card reader to initiate a transaction. Contact cards have a small square gold plate about ½" in size on the front panel, instead of a magnetic strip on the back like a credit card. When the card is inserted into a smart card reader, it makes contact with electrical connectors that transfer data to and from the chip. The bank card portion may further include raised data 24 illustrating the bank card number that has been issued by the issuer and to the bank card holder. The raised data 24 also allows for the bank card portion to be swiped by existing mechanical friction swiping mechanisms typically used in a credit card situation, such as at a restaurant or other location that does not have a motorized card reader mechanism. The bank card portion may further include a smart chip 26 which includes a storage of digital data relating to the bank card issuer and the bank card holder. The smart chip 26 also may include information relating to an affiliate of the bank card issuer. The smart chip 26 also may include account balances and other personal information about the bank card holder, making the bank card portion more versatile than typical credit or debit cards. The bank card portion also may include a replicated signature 28 of the bank card holder, which combined with the identification photo 30 of the bank card holder provides additional security measures in the attempt to prevent fraudulent use by the person other than the actual bank card holder.

As shown in FIG. 2, the multipurpose card has a back side 34 separate from the multimedia card portion 36. The multimedia card portion includes an aperture 35 to allow for the multimedia card to be located in a CD or DVD drive typical in a CD or DVD reader. The multimedia card portion 36 also may include indicia 39, which further provides an opportunity for advertisement for an affiliate or the bank card issuer, or further surface area for printing information relating to the bank card holder. The back side of the multipurpose card 34 also may include an additional barcode 37 to allow for scanning for information relating to the purchase or distribution channels of the multipurpose card 10. The barcode 37 also allows for the multipurpose card to be an item that may be purchased at a point of sale at any location capable of conducting such a transaction.

FIG. 3 further illustrates the relationship between the banking card portion 32 and the multimedia card portion 36. FIG. 3 further illustrates a force as shown in the direction of arrow 38 wherein the multimedia card portion is shown being twisted or rotated in relation to the bank card portion. Or in the alternative, the bank card portion 32 could be rotated relative to the multimedia card portion 36. When the card portions are rotated relative to each other, the outer edge 40 of the multimedia card portion is rotated out of an interconnecting groove 42 of the bank card portion revealing an underside 44 of the bank card portion.

FIG. 4 further illustrates the multimedia card portion 36 being rotated relative to the bank card portion 34. The multimedia card portion 36 includes a recessed ledge 46 that slides into and interacts with a lip 48 located on the bank card portion 34. It will appreciated by those skilled in the art that any kind of interlocking relationship or means for releasably connecting the multimedia card portion to the bank card portion may be utilized to achieve the desired results as disclosed herein. Nevertheless, the multipurpose card, as disclosed herein, has a relatively consistent thickness when the two cards are layered or sandwiched together.

Figure 5:
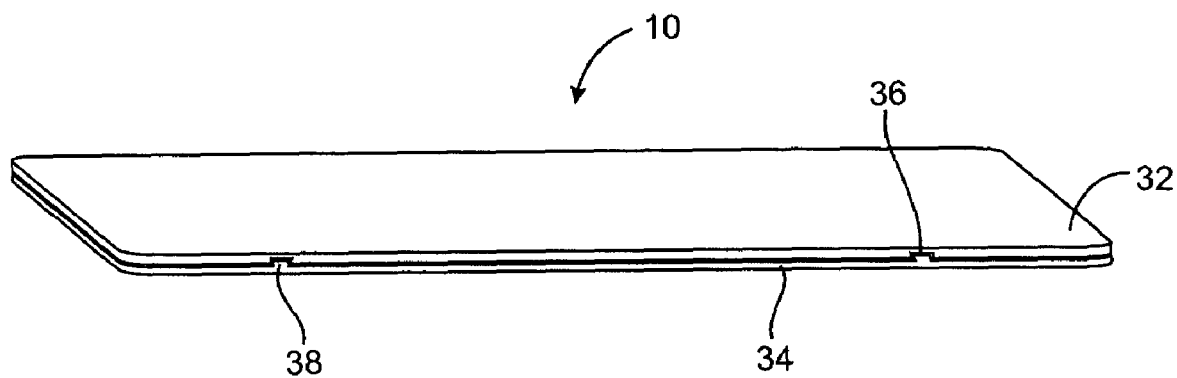
FIG. 5 illustrates a front perspective view of the card according to the present disclosure, illustrating a second embodiment.
Figure 6:
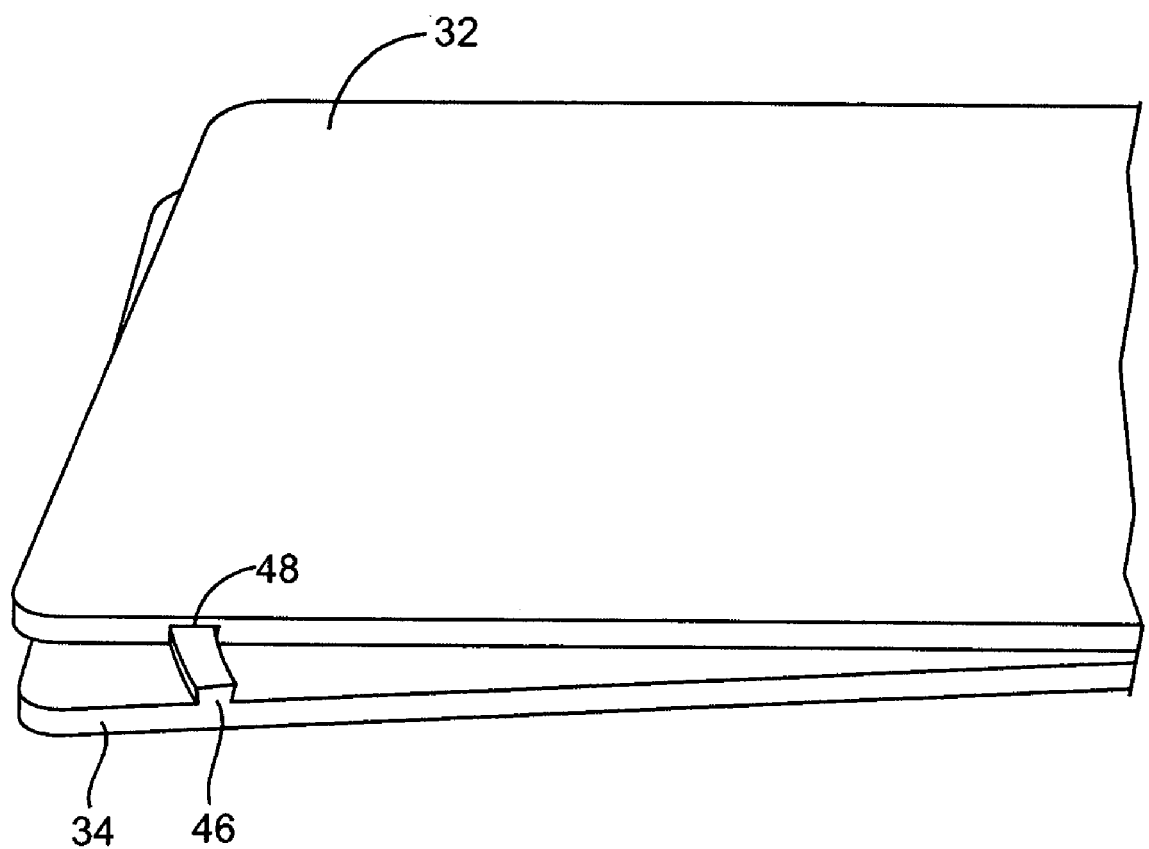
FIG. 6 is a front perspective view of the card according to the present disclosure, illustrating the multimedia portion of the card partially separated from the banking portion of the card, according to the second embodiment.

FIG. 5 illustrates a second embodiment of the disclosed multipurpose card wherein the multimedia card portion 34 includes a protrusion or protruding ridge 38 that extends into a recess 36 in the bank card portion 32. The protrusion or ridge 38 releasably interconnects with the recess 36. This is further shown in FIG. 6 wherein the protrusion or ridge 46 is shown extending into recess 48 and the multimedia card portion is shown partially extended from the bank card portion 32.

Figure 7:
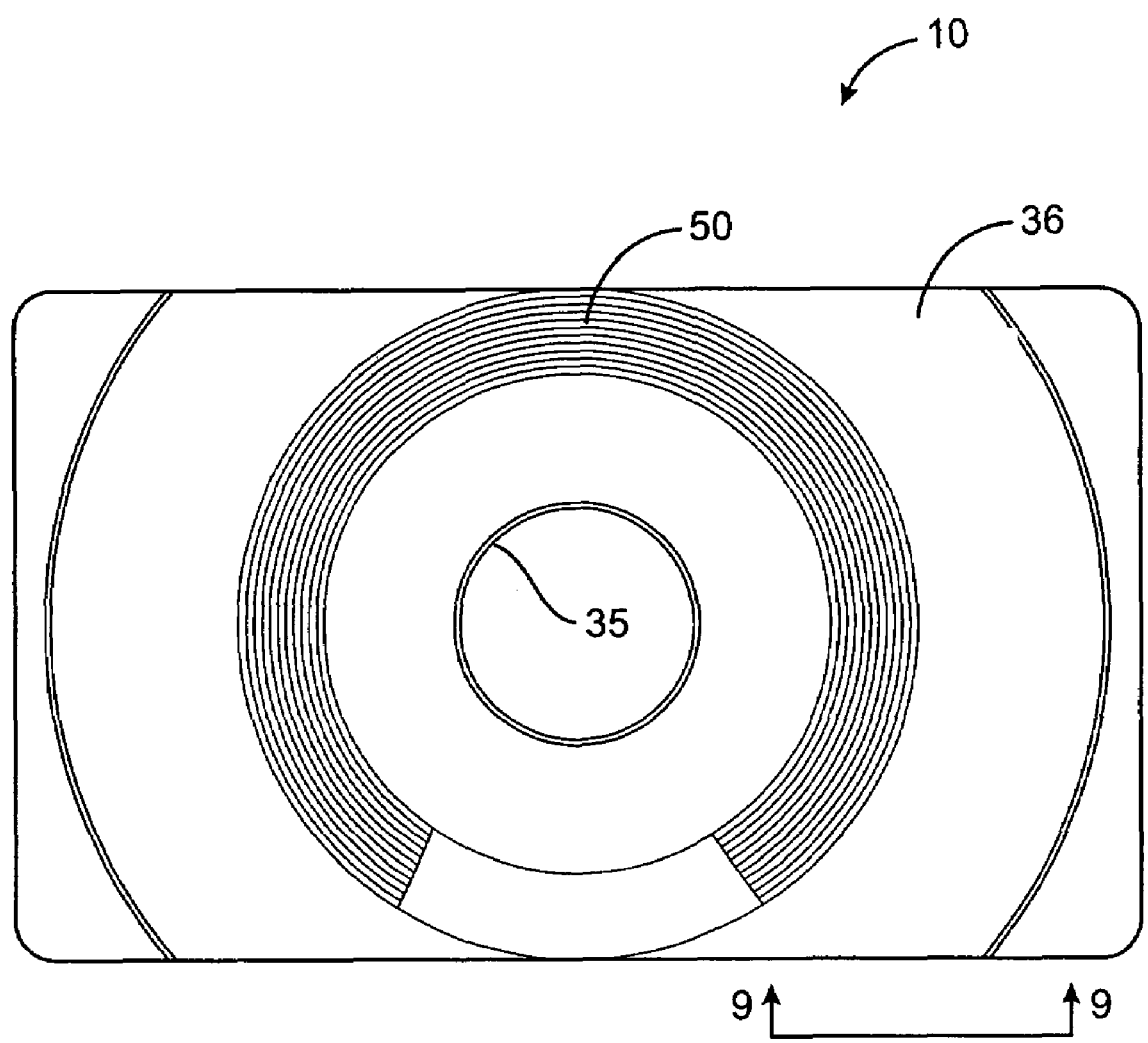
FIG. 7 illustrates a rear plan view of the card according to the second embodiment.

FIG. 7 illustrates a rear prospective view of the second embodiment wherein the multimedia card includes digitally stored data 50 as seen in this embodiment since the multimedia card portion is made of a relatively transparent material. The aperture 35 is further illustrated in FIG. 7 which allows the multimedia card portion to be utilized in a CD or DVD drive.

Figure 8:
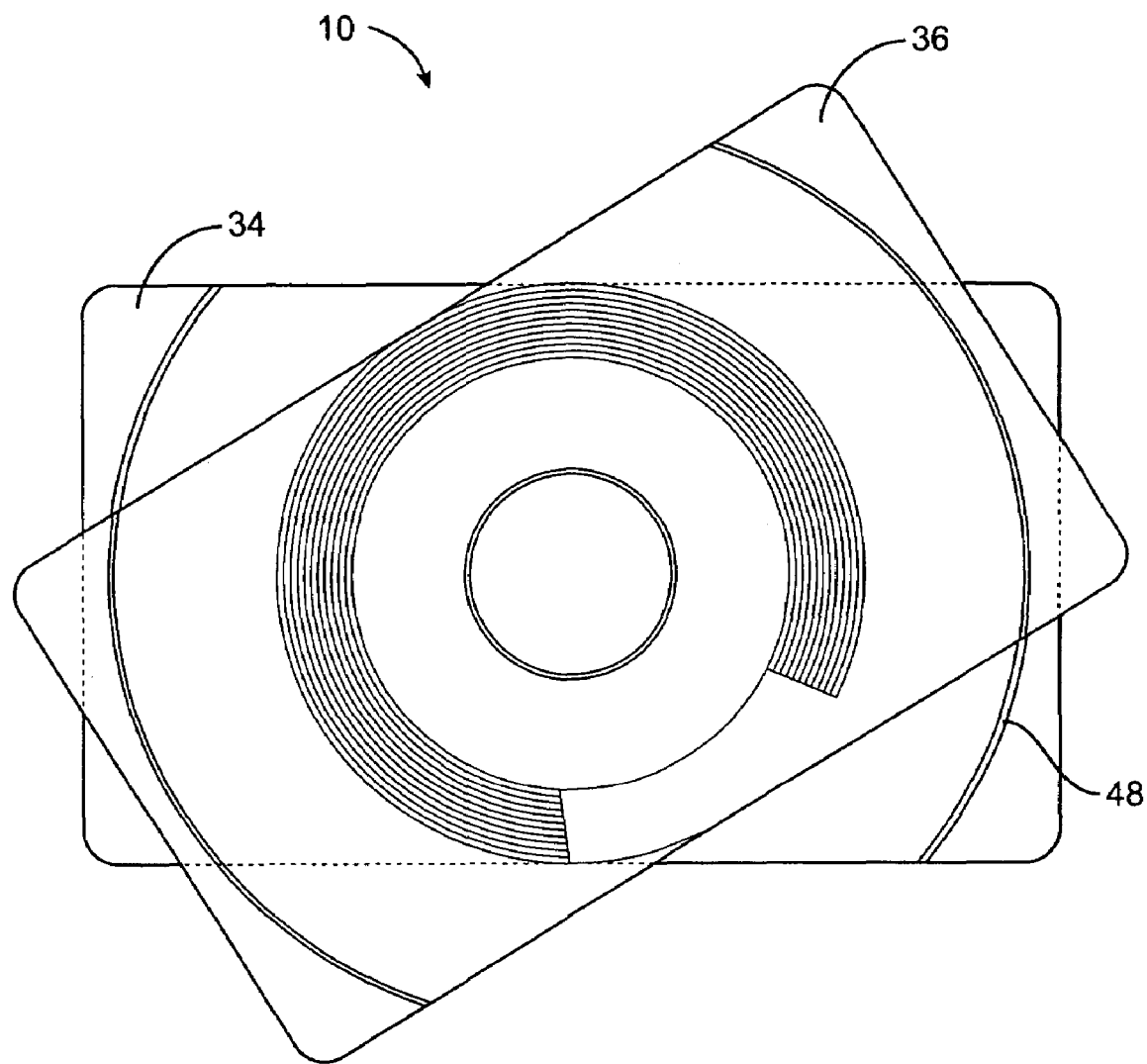
FIG. 8 illustrates a rear perspective view of the card according to the second embodiment, wherein the multimedia portion of the card is shown partially separated from the banking portion of the card.
Figure 9:
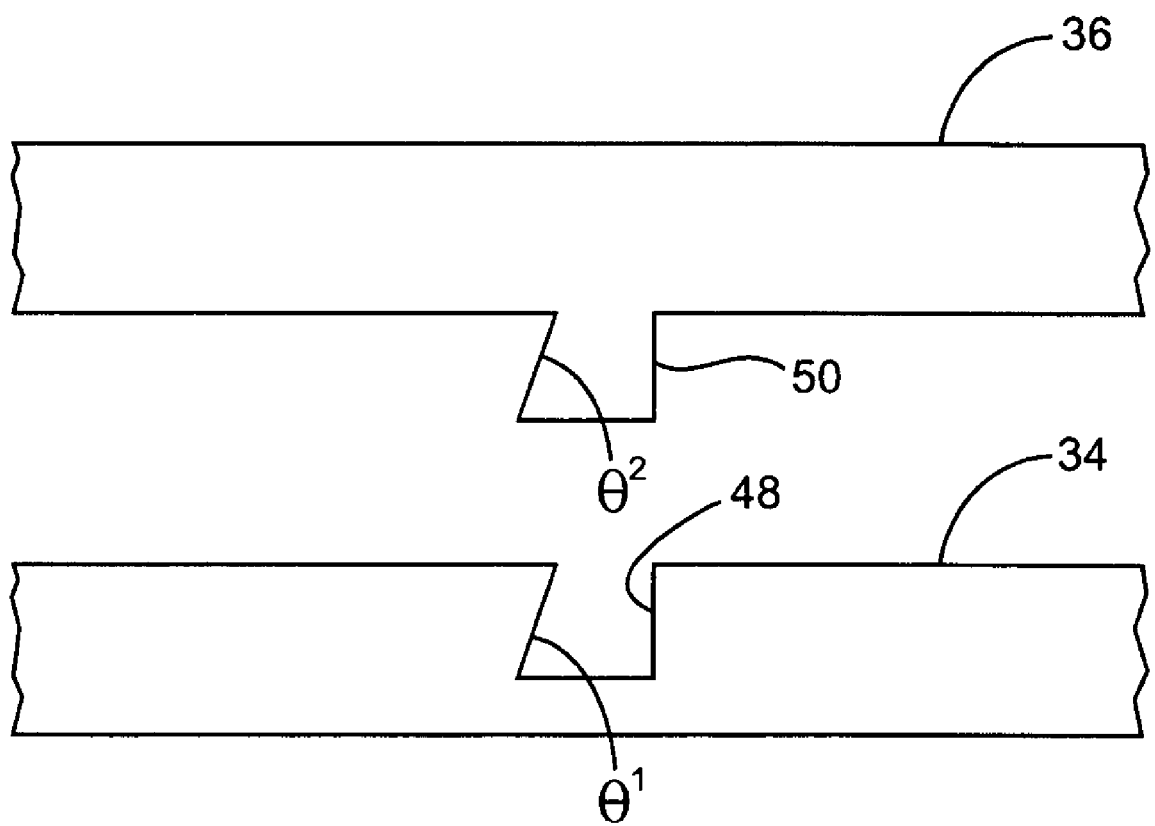
FIG. 9 illustrates a partial exploded front view of the card taken from view 9—9 from FIG. 7 illustrating how the multimedia portion of the card and the banking portion of the card interlock with each other according to the second embodiment.

FIG. 8 illustrates the multimedia card portion 36 being releasably disengaged from the bank card portion 34 and this view further illustrates the recesses 48 in the rear surface of the bank card portion. In this embodiment, the protrusions and the recesses are shown in a radius fashion, however it will be appreciated by those skilled in the art that other geometric configurations which allow for a locking relationship between the multimedia portion and the bank card portion. For example, the protrusions and the ridges can be cooperating on a radius that is much larger but not a straight line across the card portions. In other words, some friction must be provided between the card portions so that the cards do not easily become released from each other. This is further illustrated in FIG. 9 wherein the bank card portion 34 is shown with a recess 48 having an angle $\Theta^1$. Further FIG. 9 illustrates the multimedia card portion 36 with protrusion 50. Protrusion 50 includes an angle $\Theta^2$. FIG. 9 illustrates the protrusion and recess in an exploded view for clarification. The angled relationship of the protrusion 50 and the recess 48 allow for some friction when the card portions are releasably connected together and therefore the portions are not easily removed without the user applying force to one card portion relative to the other. Of course other interlocking relationships may be utilized, however, according to the present disclosure the bank card portion must maintain a certain thickness, and typically the thickness is 0.033 inch. These thicknesses allow the bank card portions to be utilized in existing terminal card readers and motorized card reader mechanisms. In addition, the protrusion 50 from the multimedia card portion 36 allows for the multimedia card portion to evenly rest in most CD or DVD drives if the drive is positioned in a horizontal relationship relative to the grounds.

Each card is printed on top-quality 0.033 inch PVC plastic and serialized to guarantee durability, security, and full functionality.

A separate embodiment is disclosed in FIGS. 10–16. In this embodiment, the multimedia card portion is made of a polycarbonate material and may be a CD, CDR, CDRW, DVD, DVDR, DVDRW, HDDVD, HDDVDR, or a HDDVDRW. These examples are exemplary only, and any future CD or DVD derivative is intended to be within the scope of the present patent.

Figure 10:
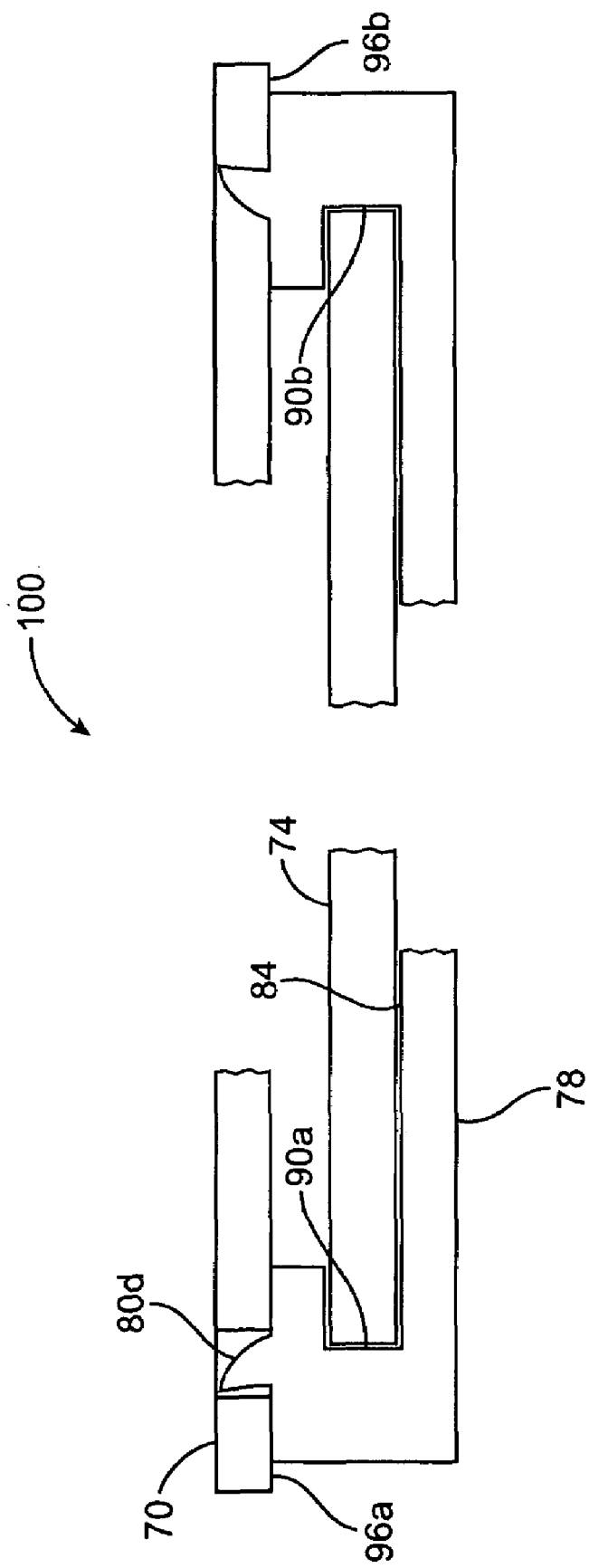
FIG. 10 is a partial cross-sectional view of the multimedia card assembly as according to an alternative embodiment.

In this embodiment, the multimedia card assembly comprises generally of three portions. The three portions are a multimedia cover portion 70, a multimedia card holder portion 78, and the multimedia portion 74. In this embodiment, the multimedia portion 74 is positively held in the multimedia card holder portion 78, as shown in FIG. 10. The multimedia cover portion 70 then removably locks into the multimedia card holder portion 78, generally enclosing the multimedia portion 74.

Figure 11:
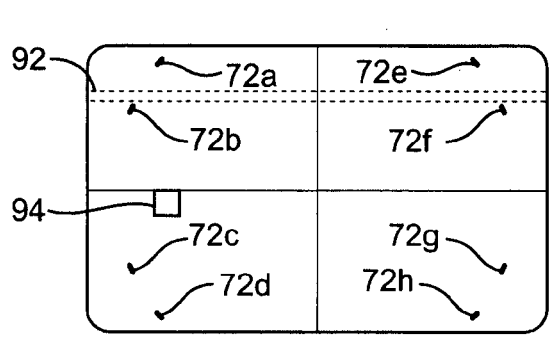
FIG. 11 is a top plan view of a multimedia cover portion according to the alternative embodiment shown in FIG. 10.

Referring now to FIG. 11, the multimedia cover portion 70 may be a bank card, such as a credit card or debit card, or an affinity card, such as a gift card or the like. Therefore, the multimedia cover portion 70 may include a magnetic stripe 92, and/or a smart chip, or other integrated circuit 94.

Figure 14:
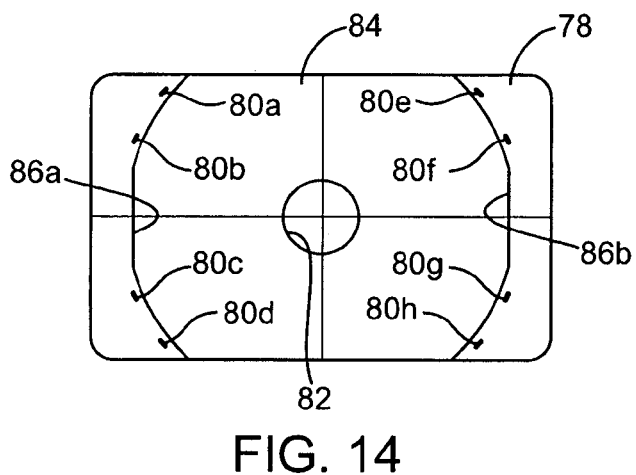
FIG. 14 is a top plan view of a multimedia card holder portion according to the alternative embodiment shown in FIG. 10.

The multimedia cover portion also includes a plurality of openings 72a through 72h. These openings are oriented to releasably interconnect with protrusions 80a through 80h, respectively, which are oriented on the multimedia card holder portion 78 (FIG. 14).

Figure 16:
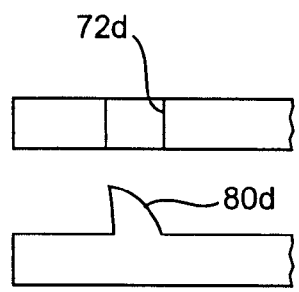
FIG. 16 is a close up cross-sectional side view of a protrusion extending from the multimedia card holder portion and an opening in the multimedia cover portion.

Referring to FIG. 16, a close up view of a protrusion 80d is shown opposed to the mating opening 72d. A positive lock is provided when a protrusion 80 is inserted into an opening 72, locking the multimedia card holder portion 78 to the multimedia cover portion 70. The resulting configuration is shown in the close up view shown in FIG. 10, wherein the multimedia cover portion 70 is releasably affixed to the multimedia card holder portion 78, effectively covering, or enclosing the multimedia portion 74 in the multimedia card assembly 100.

Figure 12:
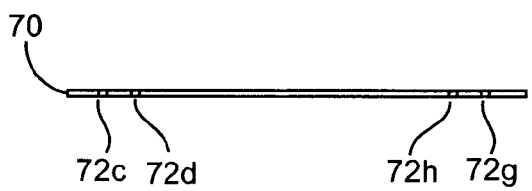
FIG. 12 is a side elevational view of the multimedia cover portion.

Referring to FIG. 12, a side view of the multimedia cover portion 70 is illustrated. The thickness of the multimedia cover portion 70 is in the range to allow the multimedia cover portion 70 to be utilized as a bank card, or other card as described above. Therefore, the multimedia cover portion 70 may be used in, for example, an ATM machine or other bank card swiping or impression type machines.

Figure 13:
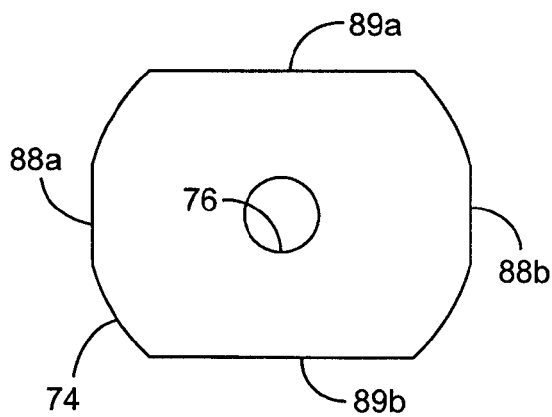
FIG. 13 is a top plan view of a multimedia portion according to the alternative embodiment shown in FIG. 10.

As shown in FIG. 13, the multimedia portion 74 includes a hub opening 76 so that the multimedia portion 74 may be utilized in a CD or DVD tray in a computer utilizing a hub to attach to the spindle of the CD or DVD appropriately. The multimedia portion 74 also includes a first side orientation flat 88a and a second side orientation flat 88b. The orientation flats 88a and 88b mate with similar orientation flats in the multimedia card holder portion 78, as will be further described below. The multimedia portion 74 also includes a top flat 89a and a bottom flat 89b which coincides with the configuration of the multimedia card holder portion 78.

The multimedia card holder portion 78 further includes a finger opening 82. The finger opening 82, in conjunction with the overhang 96, as shown in FIG. 10, allows the user to separate the multimedia cover portion 70 from the multimedia portion 74 and the multimedia card holder portion 78. Therefore, in use, the user will insert a finger through the finger opening 82 and through the hub opening 76 to apply pressure to the multimedia cover portion 70, and at the same time, the user will use their thumb and other finger, such as the middle finger or ring finger to apply pressure to the multimedia card holder portion. The user then uses their other hand to grip onto the multimedia cover portion 70 by a first overhang 96a and a second overhang 96b, to separate the multimedia cover portion 70 from the multimedia card holder portion 78. During the separation process, the protrusions 80 are removed from the openings 72.

Figure 15:
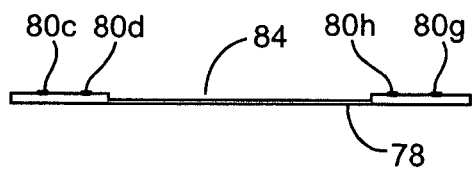
FIG. 15 is a side elevational view of the multimedia card holder portion.

The multimedia card holder portion 78 further includes a recess 84, as shown in FIG. 15. The recess allows for the multimedia portion 74 to be housed in the multimedia card holder portion 78. In operation, the multimedia portion 74 is inserted into the multimedia card holder portion 78 so that the top and bottom flats 89a and 89b are adjacent to the orientation flats 86a and 86b and the multimedia card holder portion 78. The multimedia portion 74 is then rotated so that the orientation flats 88a and 88b are adjacent to the orientation flats 86a and 86b and the multimedia card holder portion 78. As shown in FIG. 10, the multimedia portion 74 is held into place by being housed in an undercut 90a and 90b.

The undercut may be nonexistent in the areas of 86a and 86b in the multimedia card holder portion 78, so that the multimedia portion 74 may be easily released from the multimedia card holder portion 78 with minimal force from the user.

Although this disclosure has been shown and described with respect to detailed embodiments, those skilled in the art will understand that various changes in form and detail may be made without departing from the scope of the claimed disclosure.

What is claimed is:

1. A multimedia card assembly, comprising:
   a multimedia portion;
   a card-shaped multimedia holder portion configured to permanently hold the multimedia portion in place so as to form a multimedia card that presents a substantially flat surface including an exposed surface of the multimedia portion; and
   a substantially flat multimedia cover portion including one of a smart chip or magnetic stripe containing magnetic information, wherein the multimedia cover portion includes a plurality of openings, and the multimedia holder portion includes a plurality of protrusions that extend through the multimedia cover portion openings to releasably interconnect the multimedia holder portion with the multimedia cover portion, wherein the multimedia cover portion is configured to releasably interconnect with the multimedia holder portion such that the multimedia cover portion and the multimedia holder portion releasably cover the exposed surface of the multimedia portion in between the multimedia cover portion and the multimedia holder portion, wherein when separated from the cover portion, the multimedia card is usable in a multimedia reader device.

2. The multimedia card assembly, according to claim 1, wherein the multimedia portion is one of a: CD, CDR, CDRW, DVD, DVDR, DVDRW, HDDVD, HDDVDR, or a HDDVDRW.

3. The multimedia card assembly, according to claim 1, wherein the multimedia cover portion includes a plurality of openings, and the multimedia holder portion includes a plurality of protrusions that extend through the multimedia cover portion openings to releasably interconnect the multimedia holder portion with the multimedia cover portion.

4. The multimedia card assembly according to claim 1, wherein the multimedia portion is the thickness of a CD or DVD.

5. The multimedia card assembly according to claim 1, wherein the multimedia holder portion includes a finger opening.

6. The multimedia card assembly according to claim 5, wherein the multimedia portion includes a hub opening that corresponds with the finger opening.

7. The multimedia card assembly according to claim 1, wherein the multimedia holder portion includes a recess for positively holding the multimedia portion in place.

8. The multimedia card assembly according to claim 1, wherein the multimedia holder portion includes a first side orientation flat and an opposite side orientation flat that corresponds with a first side orientation flat and an opposite side orientation flat located on the multimedia portion so that the multimedia portion may be located in the multimedia holder portion.

9. The multimedia card assembly according to claim 1, wherein the multimedia cover portion extends beyond the multimedia holder portion at a first side and a second side to create a first overhang and a second overhang relative to the multimedia holder portion.

10. The multimedia card assembly of claim 1, wherein the multimedia cover portion has a thickness of about 30 mil.

11. A multimedia card assembly, comprising:

a multimedia portion;

a card-shaped holder portion configured to permanently hold the multimedia portion in place, thereby forming a multimedia card that presents a substantially flat first surface including an exposed surface of the multimedia portion; and a card-shaped multimedia cover portion includes one of a smart chip or magnetic stripe containing magnetic information, wherein the multimedia cover portion includes a plurality of openings, and the multimedia holder portion includes a plurality of protrusions that extend through the multimedia cover portion openings to releasably interconnect the multimedia holder portion with the multimedia cover portion, wherein the multimedia cover portion, wherein the multimedia cover portion is configured to releasably interconnect with the holder portion such that the multimedia cover portion releasably covers the exposed surface of the multimedia portion when held in place by the holder portion, wherein the multimedia cover portion has a thickness of about 30 mil, and wherein the exposed surface of the multimedia portion is readable when the multimedia card is placed in a multimedia reader device.

12. The multimedia card assembly of claim 11, wherein the multimedia cover portion includes a magnetic stripe containing magnetic information and a smart chip.

13. The multimedia card assembly of claim 11, wherein the multimedia portion is one of a CD or DVD media.

14. The multimedia card assembly of claim 11, wherein the holder portion includes a plurality of protrusions on the first surface to facilitate loading of the multimedia card in a tray-loading multimedia reader device.

* * * * *